United States Patent
Zou

(10) Patent No.: US 6,684,401 B1
(45) Date of Patent: Jan. 27, 2004

(54) METHOD AND SYSTEM FOR INDEPENDENT INCOMING AND OUTGOING MESSAGE DISPATCHING IN A HOME AUDIO/VIDEO NETWORK

(75) Inventor: Feng Zou, Milpitas, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/276,941

(22) Filed: Mar. 26, 1999

(51) Int. Cl.⁷ ............................... H04N 7/18
(52) U.S. Cl. ................. 725/80; 725/78; 725/85; 709/321
(58) Field of Search ............. 725/80, 78, 85, 725/82; 709/321, 107, 108

(56) References Cited

U.S. PATENT DOCUMENTS

| | | | |
|---|---|---|---|
| 3,618,039 A | * 11/1971 | Baltzly et al. | 710/1 |
| 4,893,199 A | 1/1990 | Okada | 360/48 |
| 5,420,573 A | 5/1995 | Tanaka et al. | 340/825.24 |
| 5,537,605 A | 7/1996 | Teece | 395/800 |
| 5,812,768 A | 9/1998 | Pagé et al. | 395/200.09 |
| 5,983,292 A | * 11/1999 | Nordstrom et al. | 710/54 |
| 6,032,202 A | * 2/2000 | Lea et al. | 710/8 |
| 6,052,750 A | * 4/2000 | Lea | 710/10 |
| 6,085,236 A | * 7/2000 | Lea | 709/220 |
| 6,133,938 A | * 10/2000 | James | 725/80 |
| 6,169,725 B1 | * 1/2001 | Gibbs et al. | 700/83 |
| 6,199,136 B1 | * 3/2001 | Shteyn | 710/10 |
| 6,237,049 B1 | * 5/2001 | Ludtke | 710/8 |
| 6,249,885 B1 | * 6/2001 | Johnson et al. | 379/84 |
| 6,259,707 B1 | * 7/2001 | Dara-Abrams et al. | 710/100 |
| 6,275,865 B1 | * 8/2001 | Zou | 709/313 |
| 6,349,352 B1 | * 2/2002 | Lea | 710/10 |
| 6,519,594 B1 | * 2/2003 | Li | 707/10 |
| 6,591,419 B2 | * 7/2003 | Barry et al. | 725/25 |

FOREIGN PATENT DOCUMENTS

| | | | |
|---|---|---|---|
| EP | 899660 A1 | 3/1999 | G06F/6/46 |
| JP | 2767795 | 3/1989 | H04L/5/22 |

OTHER PUBLICATIONS

"The HAVi Specification: Specification of the Home Audio/Video Interoperability (HAVi) Architecutre", HAVI Specification, XX, XX, Nov. 19, 1998 pp. 12–43–109–111, XP002116332. p. 12: line 31; p. 14: line 20; p. 41: line 8–39; p. 109: line 3–17; p. 110: line 28; p. 111: line 24.

"The HAVi Specification: Specification of the Home Audio/Video Interoperability (HAVi) Architecture", HAVI Organization, Nov. 19, 1998.*

* cited by examiner

*Primary Examiner*—John Miller
*Assistant Examiner*—Scott Beliveau
(74) *Attorney, Agent, or Firm*—Wagner, Murabito & Hao LLP

(57) ABSTRACT

In a home audio video network of connected network devices, a method of routing a received message to a software controller. An incoming message is received from a network bus by an intelligent device having a plurality of software controllers for communicating with a plurality of network devices. The incoming message are examined in a first message handling unit to determine a corresponding one of the plurality of software controllers within the intelligent device. The incoming message are dispatched to the corresponding one software controller using the first message handling unit. An outgoing message is received from one of the plurality of software controllers in a second message handling unit. The outgoing message is examined to determine a corresponding one of the plurality of network devices. The outgoing message is dispatched to the corresponding one network device with the first and second message handling units functioning independently.

27 Claims, 9 Drawing Sheets

METHOD AND SYSTEM FOR INDEPENDENT INCOMING AND OUTGOING MESSAGE DISPATCHING IN A HOME AUDIO/VIDEO NETWORK

FIELD OF THE INVENTION

The field of the present invention pertains to audio-video systems. More particularly, the present invention pertains to implementing standardized software based message dispatching for multiple devices coupled in a home audio/video network.

BACKGROUND OF THE INVENTION

A typical home audio/video equipment set up includes a number of components. For example, a radio receiver, a CD player, a pair of speakers, a television, a VCR, a tape deck, and alike. Each of these components are connected to each other via a set of wires. One component is usually the central component of the home audio/video system. This is usually the radio receiver, or the tuner. The tuner has a number of specific inputs for coupling the other components. The tuner has a corresponding number of control buttons or control switches which provide a limited degree of controllability and interoperability for the components. The control buttons and control switches are usually located on the front of the tuner. In many cases, some, or all, of these buttons and switches are duplicated on a hand held remote control unit. A user controls the home audio/video system by manipulating the buttons and switches on the front of the tuner, or alternatively, manipulating buttons on the hand held remote control unit.

This conventional home audio/video system paradigm has become quite popular. As consumer electronic devices become more capable and more complex, the demand for the latest and most capable devices has increased. As new devices emerge and become popular, the devices are purchased by consumers and "plugged" into their home audio/video systems. Generally, the latest and most sophisticated of these devices are quite expensive (e.g., digital audio tape recorders, DVD players, digital camcorders, and alike). As a consumer purchases new devices, most often, the new device is simply plugged into the system alongside the pre-existing, older devices (e.g., cassette tape deck, CD player, and the like). The new device is plugged into an open input on the back of the tuner, or some other device couple to the tuner. The consumer (e.g., the user) controls the new device via the control buttons on the tuner, via the control buttons and control switches on the front of the new device itself, or via an entirely new, separate, respective remote control unit for the new device.

As the number of new consumer electronics devices for the home audio/video system have grown and as the sophistication and capabilities of these devices have increased, a number of problems with the conventional paradigm have emerged. One such problem is incompatibility between devices in the home audio/video system. Consumer electronic devices from one manufacturer often couple to an audio/video system in a different manner than similar devices from another manufacturer. For example, a tuner made by one manufacturer may not properly couple with a television made by another manufacturer. Within conventional home audio/video systems, there is not a standardized way of coupling devices such that they interact predictably and reliably. This is especially true in the case where devices from different manufacturers are coupled together.

Another problem is the lack of standardized methods of enabling and facilitating communication between the devices coupled within the home audio/video system. The emergence of networking and interface technology (e.g., IEEE 1394 serial communication bus and the wide spread adoption of digital systems) offers prospects for correcting these problems. The dynamic capability of 1394 makes it an ideal physical media for interconnecting audio/video devices in a home network. The IEEE 1394 technology provides an architecture capable of offering a flexible distributed peer-to-peer software framework that consumer electronics companies can use to develop home audio/video devices and applications/features for those devices that were not feasible previously. Such applications/features include true plug-and-play, fully automated device self-configuration, and the like.

While the emergence of powerful networking and interface technology (e.g., IEEE 1394 serial communication bus and the wide spread adoption of digital systems) offers prospects for correcting the above problems, there is still no coherent, open, extensible architecture which can provide for a standardized, intelligent, self configuring, easily extensible architecture which facilitates reliable, trouble free communication between multiple devices in the home audio/video system.

There is no standardized architecture for ensuring reliable, conflict free, message passing between the various components of the home audio/video network. Within current home audio/video networks, there exists the significant possibility of resource conflicts within their internal massaging subsystems which may lead to an inability of the various devices coupled to the network to communicate. Such resource conflicts can cause a break down of the message passing system which forms the basis for the communication between the various software and hardware components within the home audio/video network. For example, while various home audio/video network solutions involve the use of IEEE 1394 as the basic transport layer of a network communications system, none provide a system for ensuring the seamless transmission and reception of data messages between the various software/hardware components within the home audio/video network, especially in those cases where the various software components may be distributed among different hardware platforms (e.g., devices) coupled to the home audio/video network.

SUMMARY OF THE INVENTION

The present invention provides a standardized architecture for ensuring reliable, conflict free, message passing between the various components of the home audio/video network. The present invention eliminates the possibility of resource conflicts within their internal massaging subsystems which may lead to an inability of the various devices coupled to the network to communicate, thereby avoiding conflicts that can cause a break down of the message passing system which forms the basis for the communication between the various software and hardware components within a home audio/video network. In one embodiment, an IEEE 1394 based system is provided that ensures the seamless transmission and reception of data messages between the various software/hardware components within the home audio/video network, especially in those cases where the various software components may be distributed among different hardware platforms (e.g., devices) coupled to the home audio/video network. In so doing, a more reliable, more robust real-time messaging architecture for communication between the various components is provided.

In one embodiment, the present invention is implemented as a dual dispatching process in a home audio video network of connected network devices. The dual dispatching process provides for the routing received messages to their respective proper software controllers and the routing of outgoing messages to their respective proper devices on the network bus (e.g., IEEE 1394 bus). For example, where incoming messages are received from the network bus, the receiving is performed by an intelligent device coupled to the network bus (e.g., a set-top box having an embedded computer system), wherein the intelligent device provides the computer system platform for instantiating thereon a plurality of software controllers for communicating with a plurality of network devices. The incoming messages are examined in a first dispatcher (e.g., a first software based message handling unit) to determine a corresponding one of the plurality, of software controllers within the intelligent device to which the incoming message is intended. The first dispatcher subsequently dispatches the incoming message to the corresponding one software controller. Outgoing messages from the plurality of software controllers within the intelligent device are received in a second dispatcher (e.g., a second software based message handling unit). The second dispatcher examines the outgoing messages to determine a corresponding one of the plurality of network devices to which the outgoing messages are intended. The second dispatcher subsequently dispatches the outgoing message to the corresponding one network device via the network bus. In this manner, the first and second dispatchers, while both being instantiated within the intelligent device, process incoming messages and outgoing messages independent of one another.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides an architecture for ensuring reliable, conflict free, message passing between the various components of the home audio/video network. The present invention eliminates the possibility of resource conflicts within their internal massaging subsystems that can lead to an inability of the various devices coupled to the network to communicate, thereby avoiding conflicts that can cause a break down of the message passing system which forms the basis for the communication between the various software and hardware components within a home audio/video network. The present invention provides an IEEE 1394 based system that ensures the seamless transmission and reception of data messages between the various software/hardware components within the home audio/video network, especially in those cases where the various software components may be distributed among different hardware platforms (e.g., devices) coupled to the home audio/video network.

NOTATION AND NOMENCLATURE

Figure 3:
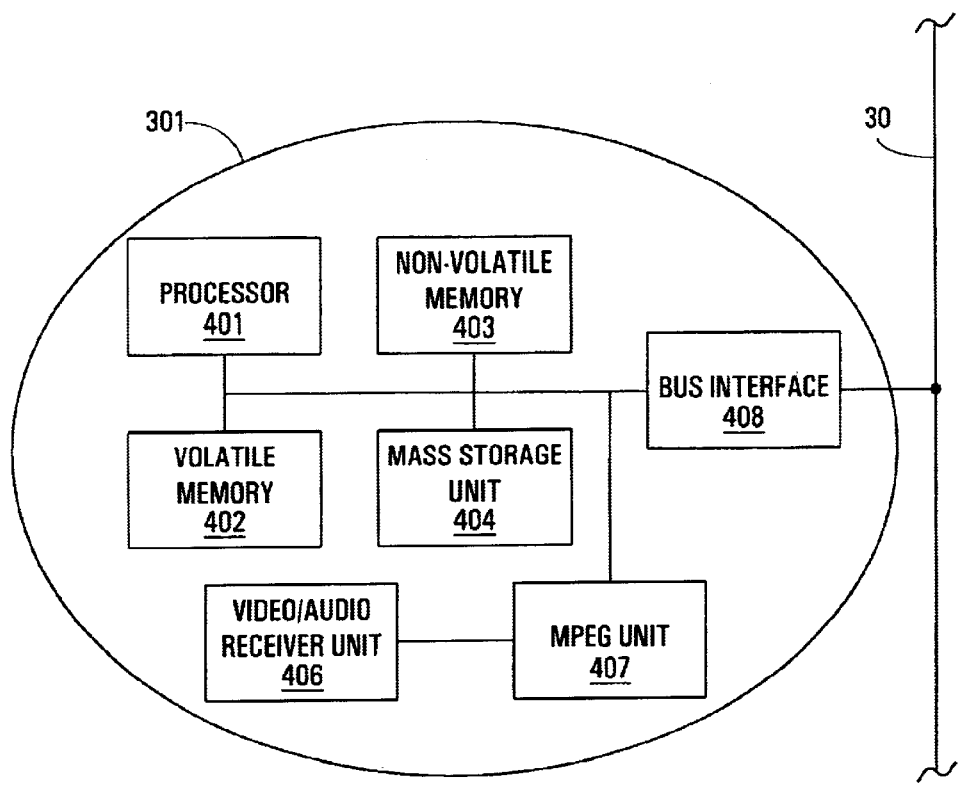
FIG. 3 shows a diagram of a set-top box in accordance with one embodiment of the present invention.

Some portions of the detailed descriptions which follow are presented in terms of procedures, steps, logic blocks, processing, and other symbolic representations of operations on data bits within a computer memory (see FIG. 3). These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "instantiating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

HAVi ARCHITECTURE OVERVIEW

In one embodiment, the Home Audio/Video Interoperability (HAVi) architecture provides the functional frame work within which the method and system of the present invention operates. HAVi provides for the creation of a Home AV (audio/video) system which provides for seamless support of new devices and problem free communication and interoperability of devices in a home AV network. The most basic components of a HAVi system in accordance with the present invention are: a home AV interoperability architecture, a series of home AV interoperability interfaces, and a home AV network. The home AV interoperability architecture is a broad, over arching term encompassing the physical network and the controlling programming interfaces. Interoperability interfaces is a term used to describe the interactions and interfaces of the components of the AV architecture. In addition to providing a common command set, the interoperability interfaces provide a software architecture which allows new devices to be integrated into the network and provide their services in a seamless manner. The home AV network is the term used to describe the physical network and its topology.

It should be noted that the home AV interoperability (HAVi) architecture of the present invention (e.g., with which the present invention is compliant) is an open, platform-independent, architecturally-neutral network that allows consumer electronics manufacturers and producers to provide inter-operable appliances. It can be implemented on different hardware/software platforms and does not include features that are unique to any one platform. The interoperability interfaces of the HAVi architecture are extensible and can be added to, modified and advanced as market requirements and technology change. They provide the infrastructure to control the routing and processing of isochronous and time-sensitive data (e.g., such as audio and video content).

It should also be noted that while the embodiments which follow and the discussions thereof are often described in the context of an IEEE 1394 based home audio/video network and the HAVi architecture in general, the present invention is not limited to specific implementations with IEEE 1394 technology or with a HAVi architecture. Other types of networking technology can be used to implement the physical communications frame work required by the present invention. Such other types of networking technology include, for example, ethernet, token ring, universal serial bus, etc. Additionally, other types of hardware/software component interoperability architectures besides HAVi can be used with the communications architecture of the present invention. specifically,

A HAVi NETWORK IMPLEMENTATION

Figure 1A:
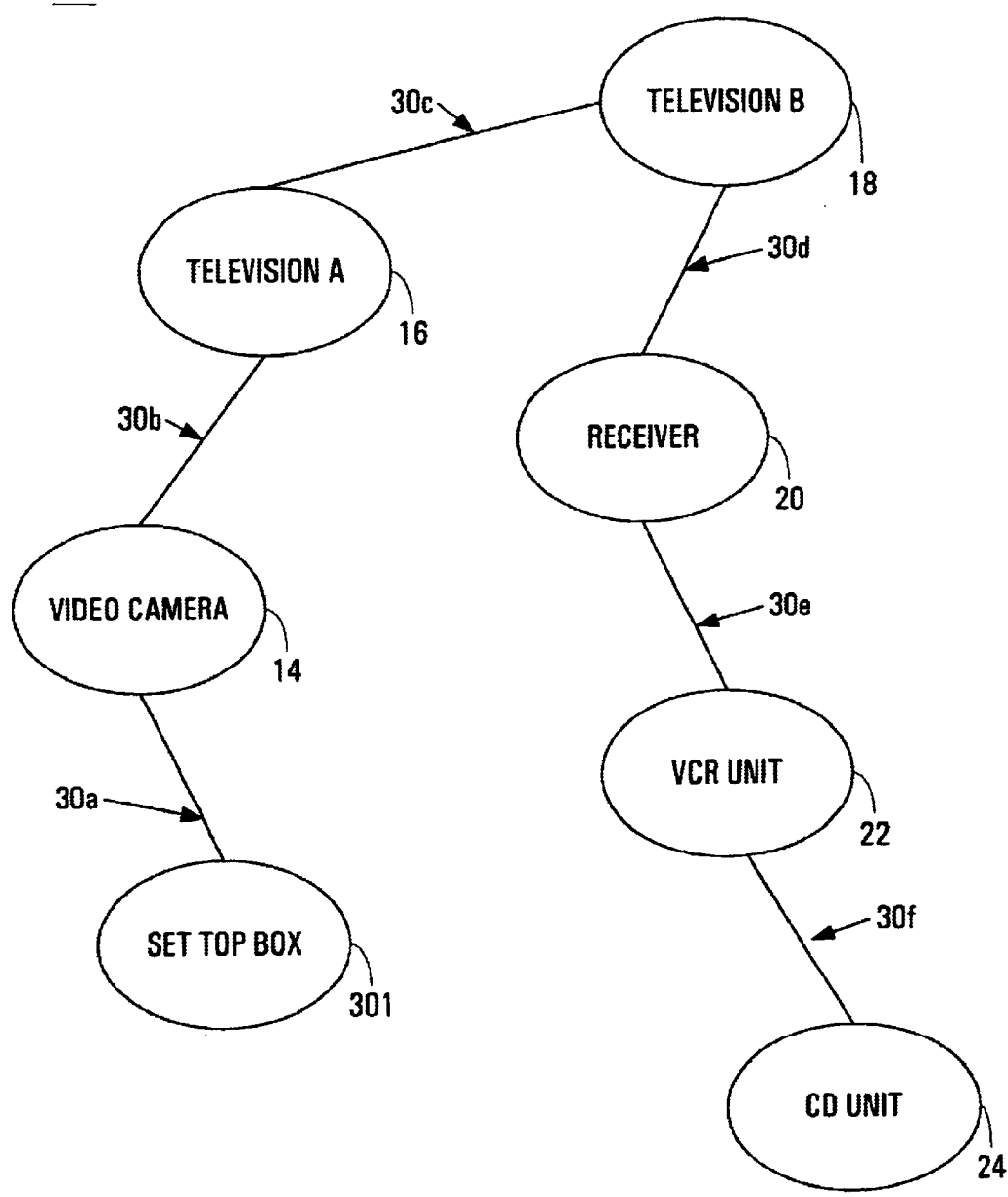
FIG. 1A shows a home AV network in accordance with one embodiment of the present invention.

With reference now to FIG. 1A, a HAVi network 10a in accordance with one embodiment of the present invention is shown. The HAVi architecture supports a wide range of devices including intelligent receiver/decoders (IRDs), for example, the set-top box 301, digital video tape records (DVTRs), video cassette recorders (VCRs), personal computers (PCs), digital video disk players (DVDs), etc., communicating via a common messaging system. FIG. 1A illustrates the physical port-to-port connecting configuration 10a of an exemplary HAVi network. CE devices ("devices") 301, 14, 16, 18, 20, 22 and 24 are shown connected together with bus segments 30a–30f. In one embodiment of HAVi, the IEEE 1394 serial communication bus standard is used as a platform to provide the common messaging system.

Figure 1B:
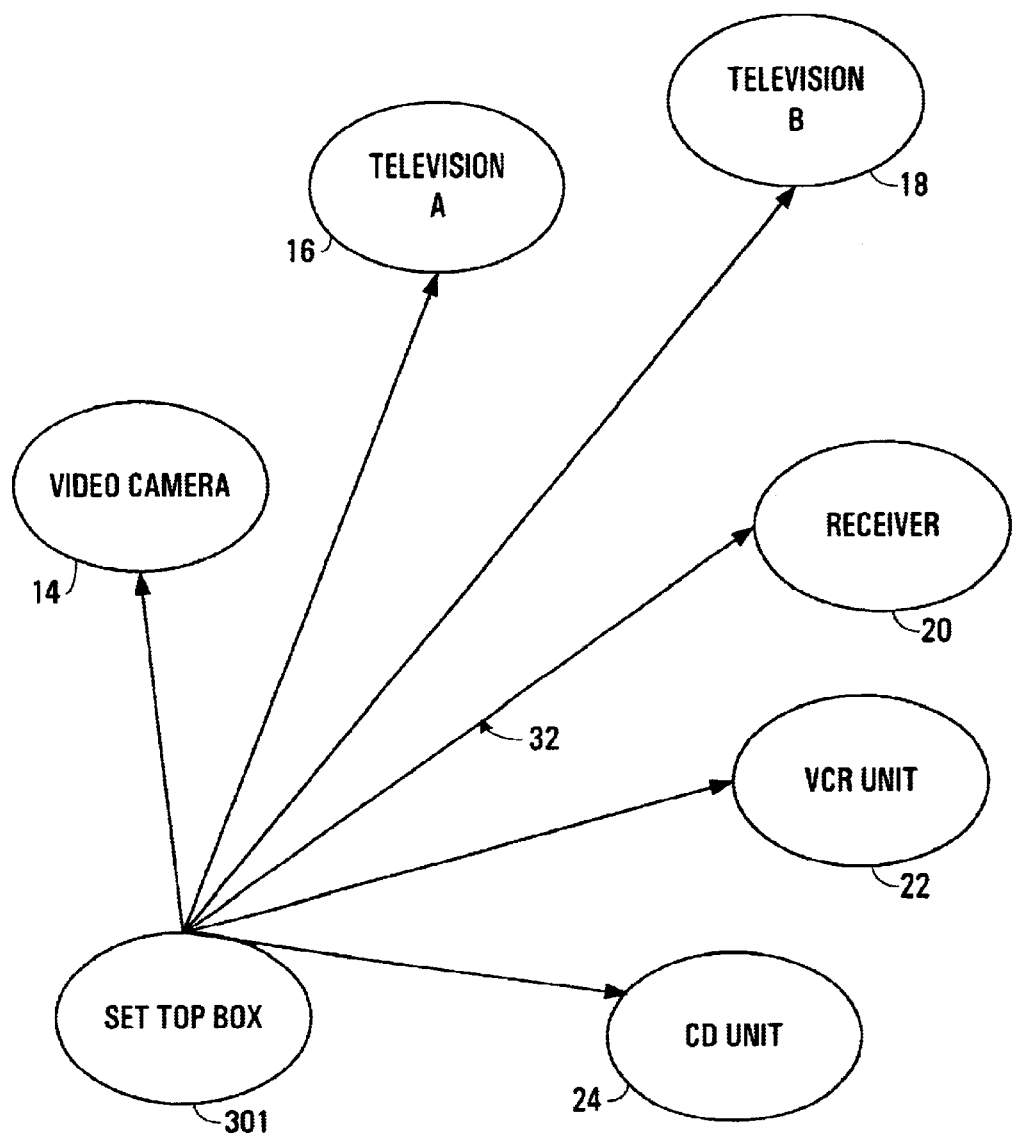
FIG. 1B illustrates a logical bus configuration of the HAVi network of FIG. 1A.

FIG. 1B illustrates a logical bus configuration 10b of the HAVi network of FIG. 1A. As shown in FIG. 1B, all of the devices 301, 14, 16, 18, 20, 22 and 24 of the HAVi network can be viewed as logically coupled to a common IEEE 1394 serial communication bus 30. Within this bus configuration 10b, peer-to-peer device communication is supported. For example, as shown in FIG. 1B, any device (having appropriate capabilities), e.g., device 12, can send or receive communication packets from any other device in the HAVi network. In the example of FIG. 1B, the set-top-box (e.g., an IRD) can receive messages from or generate messages to any of the other devices 14, 16, 18, 20, 22 and 24 of the HAVi network.

Referring still to FIGS. 1A and 1B, as described above, the interoperability model in HAVi provides for the following: 1) support for existing devices; 2) a default control model; 3) a means to extend the default control model when new devices or functionality is brought to market; and 4) a common means for device representation (e.g., graphics user interfaces). To achieve the above, the HAVi architecture defines three types of nodes in the home network: Full AV nodes (FAV), Intermediate AV nodes (IAV) and Base AV nodes (BAV).

A Full AV node is a device that contains a complete instance of the AV software model. This type of node generally has a richer set of resources and is capable of supporting a complex software environment. The primary distinguishing feature of a FAV is that it is able to take control responsibility for less sophisticated devices and does this by loading a control module, usually from the less sophisticated device, and executing it locally. Examples of such nodes would be Set-top Boxes (e.g., set-top box 301), Smart TV's that incorporate embedded computer systems, general purpose home control devices, general purpose PCs, and the like.

Intermediate AV nodes are generally lower cost devices that have limited resources. They do not provide an execution environment for control modules and so can not act as master controllers within the home network. Because they have limited resources, they can access remote resources in one of two ways: by working with other IAV devices who provide some capability they lack, or by using an FAV node which supports a control module to control them. In this second mode of operation they rely on full AV nodes to provide such facilities as a display device, general. purpose computing resources and some overall control framework. This allows Full AV devices to bind a variety of intermediate AV devices together to provide a service or abstraction to the user.

Base nodes are nodes that are neither FAV or IAV nodes. These are two generic types: Legacy base nodes, and other base nodes. Legacy base nodes are devices that were built before the advent of the HAVi architecture. These devices often use proprietary protocols for their control, and quite frequently have a simple, well defined, control only protocol. Such devices can work in the HAVi network but require that a Full AV node act as a gateway. Communication between a Full or Intermediate AV node and legacy devices requires that the Home AV commands used in the HAVi architecture be translated to and from the legacy command protocol. Other base nodes are devices that, for business or resource reasons, choose to implement future proof behavior using uploadable control software and do not carry any of the HAVi architecture or the message communication system. These devices will be controlled by an FAV node with a private command protocol between FAV and BAV node.

Additional details regarding the implementation and interoperability of the HAVi architecture and the implementation of FAV, IAV, and BAV nodes within the HAVi architecture can be found in U.S. Pat. No. 6,032,202 entitled "A HOME AUDIO/VIDEO NETWORK WITH TWO LEVEL DEVICE CONTROL MODULES", filed on Jan. 6, 1998, U.S. Pat. No. 6,349,352 entitled "HOME AUDIO/VIDEO NETWORK WITH BOTH GENERIC PARAMETERIZED DEVICE CONTROL", filed on Jan. 6, 1998, U.S. Pat. No. 6,052,750 entitled "A HOME AUDIO/VIDEO NETWORK WITH UPDATABLE DEVICE CONTROL MODULES", filed on Jan. 6, 1998, U.S. Pat. No. 6,085,236 entitled "AUDIO/VIDEO NETWORK WITH DEVICE CONTROL MODULES FOR INCORPORATED LEGACY DEVICES", filed on Jan. 6, 1998, U.S. patent application Ser. No. 09/003,412 entitled "METHOD AND SYSTEM FOR DOWNLOADING APPLICATIONS FOR CONTROLLING DEVICES WITHIN A HOME AUDIO/VIDEO NETWORK", filed on Jan. 6, 1998, and U.S. Pat. No. 6,169,725 entitled "APPARATUS AND METHOD FOR RESTORATION OF INTERNAL CONNECTIONS IN A HOME AUDIO/VIDEO SYSTEM", filed on Oct. 30, 1998, which are each incorporated herein by reference.

Figure 2:
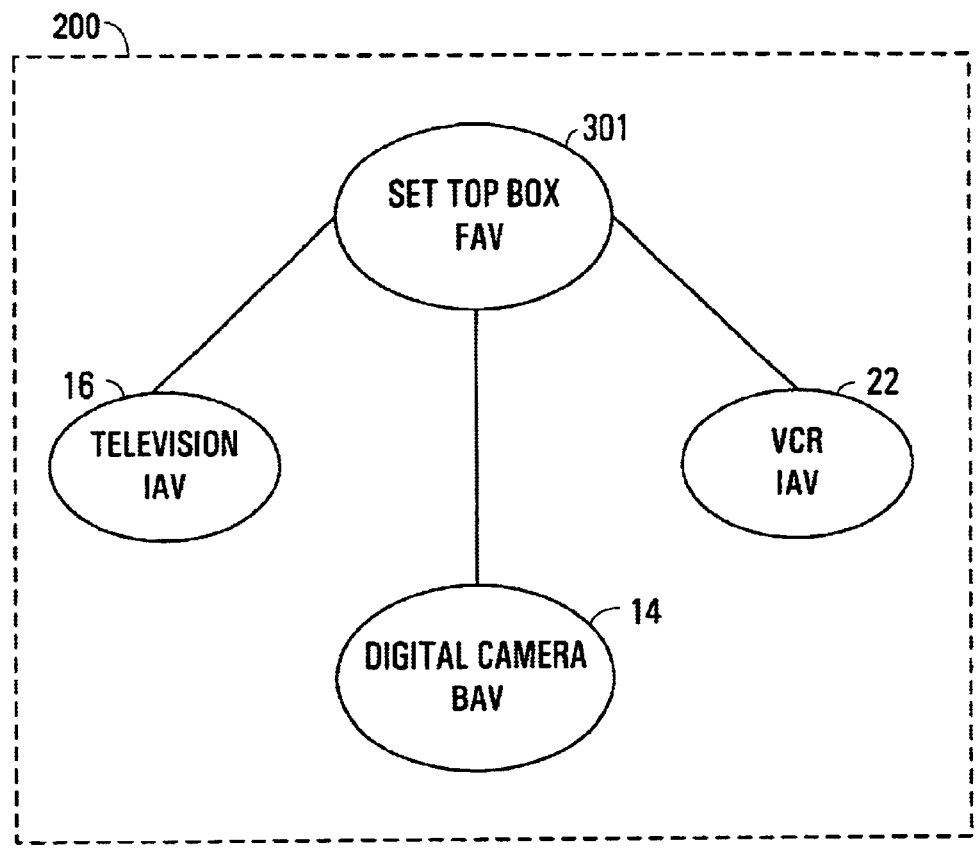
FIG. 2 shows an exemplary FAV node network cluster in accordance with one embodiment of the present invention.

Referring now to FIG. 2, a single FAV cluster 200 in accordance with one embodiment of present invention is shown. HAVi network 200 includes an FAV 301 (e.g., a set-top box 301 from FIG. 1A) respectively coupled to a first IAV 16 (e.g., television A16) a second IAV 22 (e.g., VCR 22) and a BAV 14 (e.g., video camera 14). In HAVi network 200, FAV 301 controls IAV and BAV devices (e.g., devices 16, 14, and 22), providing cluster-wide services.

With reference now to FIG. 3, a diagram of a set-top box 301 in accordance with one embodiment of the present invention is shown. As described above, any consumer electronics device can be a FAV and thereby provide a computer system platform for HAVi software. For instance, the set-top-box 301 device of the exemplary HAVi network contains special components that provide an operation platform for software components of the HAVi architecture which are described below. Specifically, aspects of the present invention, described below, are discussed in terms of steps executed on a computer system (e.g., the process shown in FIGS. 7A and 7B). Although a variety of different computer systems can be used with the present invention, an exemplary general purpose computer system is shown in the set-top-box of FIG. 3.

Set-top-box 301 of FIG. 3, in addition to having a video/audio receiver (decoder) unit 406 and MPEG unit 407 also includes an address/data bus 400 for communicating information, one or more central processors 401 coupled with the bus for processing information and instructions, a volatile memory 402 (e.g., random access memory RAM) coupled with the bus 400 for storing information and instructions for the central processor 401 and a non-volatile memory 403 (e.g., read only memory ROM) coupled with the bus 400 for storing static information and instructions for the processor 401. Set-top-box 301 can also optionally include a data storage device 404 ("disk subsystem") such as a magnetic or optical disk and disk drive coupled with the bus 400 for storing information and instructions. Also included in the set-top-box 301 is a bus interface unit 408 for interfacing with bus 30 (e.g., an IEEE 1394 serial bus). Set-top-box 301 can operate under a variety of different operating systems (e.g., Windows operating system, DOS operating system, Macintosh O/S), but in the present embodiment the Aperios™ operating system can be used. Alternatively, the computer system platform depicted in FIG. 3 can be implemented in other devices coupled to network 30, such as, for example, a digital HDTV device or the like.

Figure 4:
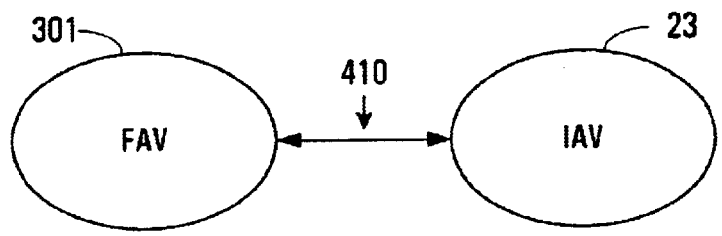
FIG. 4 shows a diagram of an FAV node, an IAV node, and a connection there between in accordance with one embodiment of the present invention.

With reference now to FIG. 4, a diagram 400 showing FAV node 301, IAV node 23, and a connection 410 there between is shown. Within the context of the HAVi specification, FAV nodes (e.g., FAV node 301) function as software managers. FAV node 301 provides a platform for the services that support the HAVi architecture. FAV node 301 provides an execution environment which allows objects to control and communicate with services and devices. To ensure that devices are accessible within the Home AV network, the FAV nodes support a software based abstraction of the services that a device offers to others. This abstraction is referred to as a device control module (DCM). The interface that a DCM exposes to the rest of the system provides the means to access and control that DCM's respective device. In the general case, an FAV will manage a set of DCMs, one for each IAV node and BAV node in the home network or portion of the network that it manages. Thus, it should be appreciated that from a communications and interoperability perspective, one primary role of an FAV node is to manage DCMs and act as an execution environment for DCMs.

With continuing reference to FIG. 4, IAV 23 and FAV 301 communicate by sending messages over the home network using a message passing system. When new devices join the home network, they are recognized and added to a global name database (registry). The registry holds information about their characteristics and provides a reference to a handler for that device. Other devices and services are able to query the registry to locate a device and then using the handler, can interact with the device. For additional descriptions and related art regarding the communication and identification processes of the present invention, the reader is referred to Ogino, et al., entitled "METHOD AND SYSTEM FOR PROVIDING A DEVICE IDENTIFICATION MECHANISM WITHIN A CONSUMER AUDIO/VIDEO NETWORK", a U.S. Pat. No. 6,038,625, filed on Jan. 6, 1998, which is incorporated herein by reference.

Figure 5:
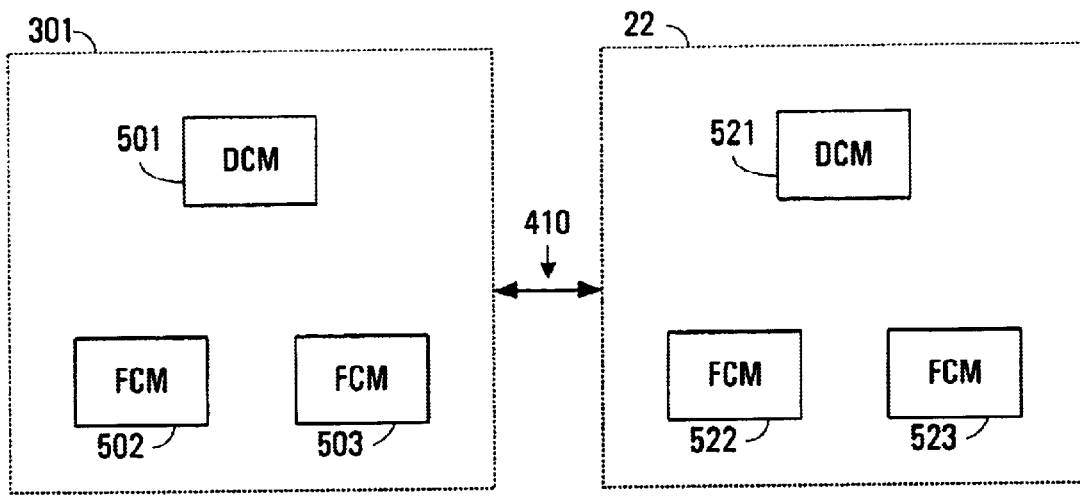
FIG. 5 shows the full AV node and the basic AV node of FIG. 4 with respect to their internal FCMs and DCMs.

Referring now to FIG. 5, FAV node 301 and BAV node 22 are shown with respect to their respective internal DCMs and FCMs. As depicted in FIG. 5, FAV node 301 includes a DCM 501 which further includes an FCM 502 and an FCM 503. BAV node 22 includes a DCM 521 which further includes an FCM 522 and an FCM 523. In accordance with the present invention and in accordance with the HAVi specification, an FCM is a software object providing an interface via which applications invoke related operations provided by the respective device. The DCM functions as a "container" for the various FCMs associated with a particular device. The DCM groups the various FCMs which represent the functional components of the particular device. Typically, FCMs refer to hardware resources within a device. For example, in a case where BAV node 22 is a VCR device, BAV node 22 will include one or more FCMs for its various internal functional components. For example, FCM 522 can be associated with controlling the tuning hardware of the VCR, while FCM 523 is associated with the tape drive mechanism of the VCR. Similarly, in the case where FAV node 301 is a set-top box (e.g., set-top box 301 of FIG. 1A), FCM 502 could be associated with the cable television decoding hardware of the set-top box, while FCM 503 is associated with the remote control unit for the set-top box.

Figure 6:
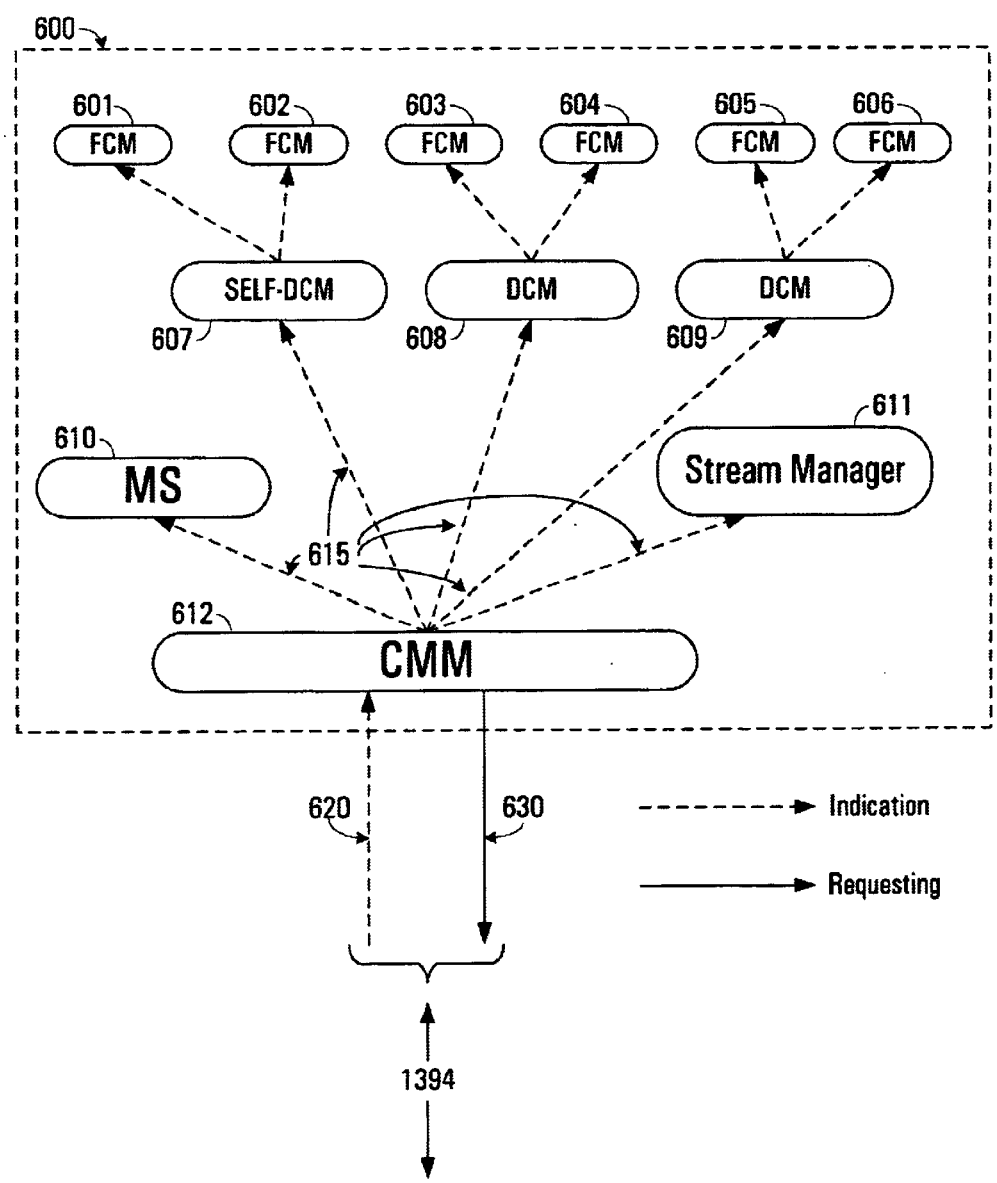
FIG. 6 shows a overview diagram of the dispatch system implemented by one embodiment of the present invention.

Referring now to FIG. 6, a diagram of a dispatching system 600 in accordance with one embodiment of the present invention is shown. The system 600 includes a plurality of FCMs, FCM 601 through FCM 606. The FCMs 601–606 are coupled as shown to a self DCM 607, a DCM 608, and a DCM 609. DCMs 607–609 are coupled to a CMM (communications media manager) 612. An MS (message system) unit 610 and a stream manager 611 are also coupled to CMM 612. All of the components 601 through 612 are software based components instantiated within the memory of an FAV node (e.g., FAV node 301).

In accordance with present invention, CMM (communications media manager) 612 functions as a gateway for sending and receiving the 1394 packets to and from various remote nodes in a HAVi network (e.g., HAVi network 10a of FIG. 1A). As described above, a FAV node may have multiple devices associated with it, each being represented by a DCM instantiated within the memory of the FAV node. Each sub-unit, or internal functional component, within a device will be represented by an FCM. The TAM (Transport Adaptation Module) of Message System 610 and an associated Connection Control Module may also sit on top of the CMM 612. Even though the high level communications between HAVi components can be done through MS 610, the actual control commands for a BAV or IAV device are required to go to the CMM 612 directly. The FAV node itself also needs a DCM (e.g., self DCM 607) plus some FCMs (e.g., FCM 601 and FCM 602) to represent itself and its internal sub-units to other devices on the network.

As used herein, a request refers to an outgoing message from one of components 601 through 612 to an associated device coupled to the HAVi network. An indication refers to an incoming message from the associated device that results from the request (e.g., a response). CMM 612 functions by routing any request received from any of components 601–611 to the network via the 1394 connection. CMM 612 also functions by dispatching the resulting indications returning from a device on the network to the correct one of components 601–611. The outgoing requests are represented in FIG. 6 by line 630. The incoming indications received by CMM 612 are represented by line 620.

Additionally, it should be noted that, in order to allow a BAV device to partially control a FAV device through some basic AVC or other commands, self DCM 607 of the FAV node needs to provide such support to handle remote indication directly. Thus, CMM 612 may receive indications from various devices in the network. An incoming indication, or message, may target to any component within a FAV or IAV node, as shown by the plurality of dashed lines 615 in FIG. 6. The present invention functions to dispatch the indication to the right component.

Referring still to FIG. 6, indications 620 returning from devices on the HAVi network are received by CMM 612. CMM 612 in turn, dispatches the indications to the appropriate DCM, as shown by lines 615. In accordance with the present embodiment, CMM 612 only dispatches to the DCM level, and each DCM is responsible for dispatching the indication to the right FCM that belongs to it. Indications going to an FCM are routed through its DCM. There are at least two reasons to use such a hierarchy structure. First, a particular DCM knows better than CMM 612 with regard to the dispatching of its respective FCM. Second, this reduces the processing burden on CMM 612.

For additional descriptions and related art regarding the hierarchical communication and message passing methodology among DCMs, FCMs and the CMM as practiced in various aspects of the present invention, the reader is referred to Feng Zou, "A METHOD AND SYSTEM FOR MESSAGE DISPATCHING IN A HOME AUDIO/VIDEO NETWORK", a U.S. patent application Ser. No. 09/199,973, filed on Nov. 25, 1998, which is incorporated herein by reference.

Figure 7:
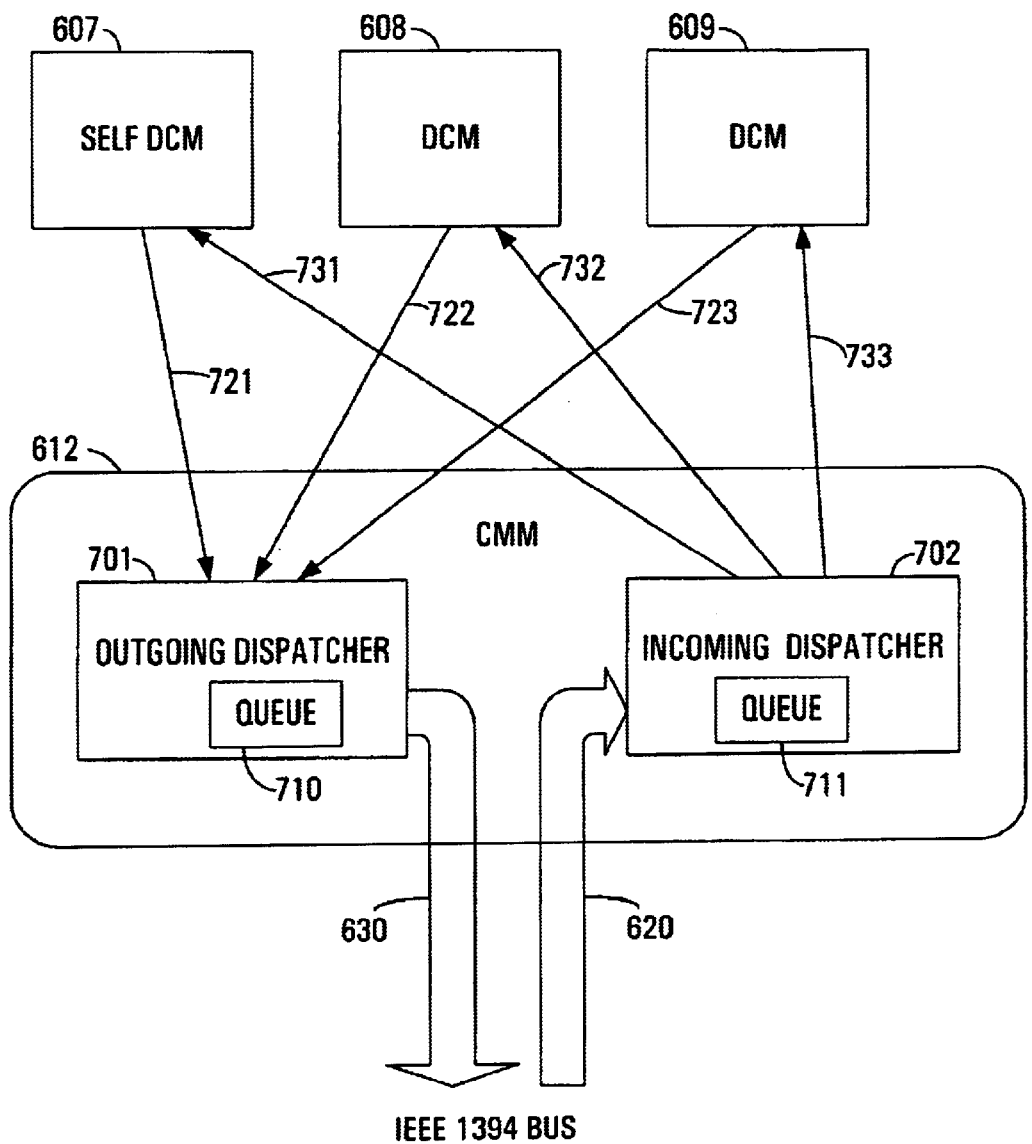
FIG. 7 shows a diagram of a dual dispatching process in accordance with one embodiment of the present invention.

With reference now to FIG. 7, a diagram of a dual dispatching process in accordance with one embodiment of present invention shown. As depicted in FIG. 7, CMM 612 includes to dispatching units, outgoing dispatcher 701 and incoming dispatcher 702. Dispatchers 701 and 702 are both software based message handling units instantiated within the memory of an appropriate computer system platform (e.g., set-top box 301 of FIG. 3). Outgoing dispatcher 701 is configured to handle outgoing messages from a plurality of software controllers, such as, for example, self DCM 607, DCM 608, and DCM 609. Incoming dispatcher 702 is configured to handle incoming messages from the various external devices (not shown) coupled to the 1394 bus. The communication paths used by DCMs 607–609 for outgoing messages are shown by lines 721–723. The communication paths used by DCMs 607–609 for incoming messages are shown by lines 731–733.

In this embodiment, the dual dispatchers 701 and 702 implement a reliable dispatching process provides for the routing received messages to their respective proper software controllers and the routing of outgoing messages to their respective proper devices on the network bus (e.g., IEEE 1394 bus). The incoming messages (indications) are examined in dispatcher 702 to determine a corresponding DCM to which the incoming message is intended. Dispatcher 702 subsequently dispatches the incoming message to the corresponding one DCM (e.g., DCM 609 via line 733). Outgoing messages from the DCMs within the intelligent device are received by dispatcher 701 (e.g., a second software based message handling. unit). The dispatcher 701 examines the outgoing messages to determine a corresponding one of the plurality of network devices to which the outgoing messages are intended. Dispatcher 70 subsequently dispatches the outgoing message to the corresponding one network device via the 1394 bus. In this manner, dispatchers 701–702, while both being instantiated within the FAV node 301, process incoming messages and outgoing messages independent of one another.

The independent processing of outgoing messages and incoming messages is very advantageous in the context of an embedded computer system of an FAV node. For example, set-top box 301 is typically configured to run a real-time operating system to provide a necessary computer system platform for its software based functionality. An example of such a real-time operating system is the Aperios OS™ provided by Sony Corporation. As is well known in the art, real-time embedded software applications tend to limit the amount of re-entrant code employed. Accordingly, the re-entrant code limitation has the effect of limiting the number of simultaneous processes, or threads, which can be implemented within a single software routine or function. Hence, a single dispatcher is limited in the number of threads which can simultaneously support.

In most widely used implementation, a single dispatcher can support two simultaneous threads. Thus, in certain prior implementations where only a single dispatcher is used for process both outgoing messages and incoming messages, if one DCM within a node sends a request and another DCM within the same node also sends a request, the two thread capacity of the single dispatcher is completely utilized, such that any incoming indication from an external device cannot be received by the node. In such a prior art implementation, no additional thread can be instantiated for processing the incoming indication.

In accordance with the present invention, however, dual dispatching is implemented such that a processing of incoming messages is completely independent from the processing of outgoing messages. No re-entrant code is employed. For example, referring still to FIG. 7, outgoing dispatcher 701 is configured to support only a single thread at any given time. Similarly, incoming dispatcher 702 is configured to support only a single thread any given time. Thus, their respective execution within the FAV node 301 is highly efficient and highly reliable. In addition, dispatchers 701–702 respectively include a queue 710 and a queue 711. Queues 710–711 allow the dispatchers to line up successive messages for processing on a first-in first out (FIFO) basis.

For example, where dispatcher 701 receives an outgoing message from DCM 607 via line 721, a subsequent outgoing message from DCM 608 received via line 722 is temporarily stored within queue 710 for processing after the message from DCM 607 is dispatched. In this manner, dispatcher 701 ensures none of the internal DCMs included within the FAV node 301 is starved for access to external devices. Similarly, where an incoming message is received from the 1394 bus by dispatcher 702, a subsequent incoming message from an external device is temporarily stored within queue 711 until the previous message is dispatched to the corresponding internal DCM (e.g. DCM 608 via line 732).

In this manner, dispatchers 701–702 within CMM 612 provide an architecture for ensuring reliable, conflict free, message passing between the various components of the home audio/video network. The use of dual dispatchers (e.g., dispatchers 701–702) eliminates the possibility of resource conflicts within the internal message structure of the FAV node 301, which may lead to an inability of the various devices coupled to the network to communicate. Dispatchers 701–702 as implemented within CMM 612 are fully compatible with IEEE 1394, and thus provide an IEEE 1394 based system that ensures the seamless transmission and reception of data messages between the various software/hardware components within the home audio/video network. This is particularly advantageous in those cases where various DCMs and FCMs are distributed among different hardware platforms (e.g., devices) coupled to the home audio/video network.

Figure 8A:
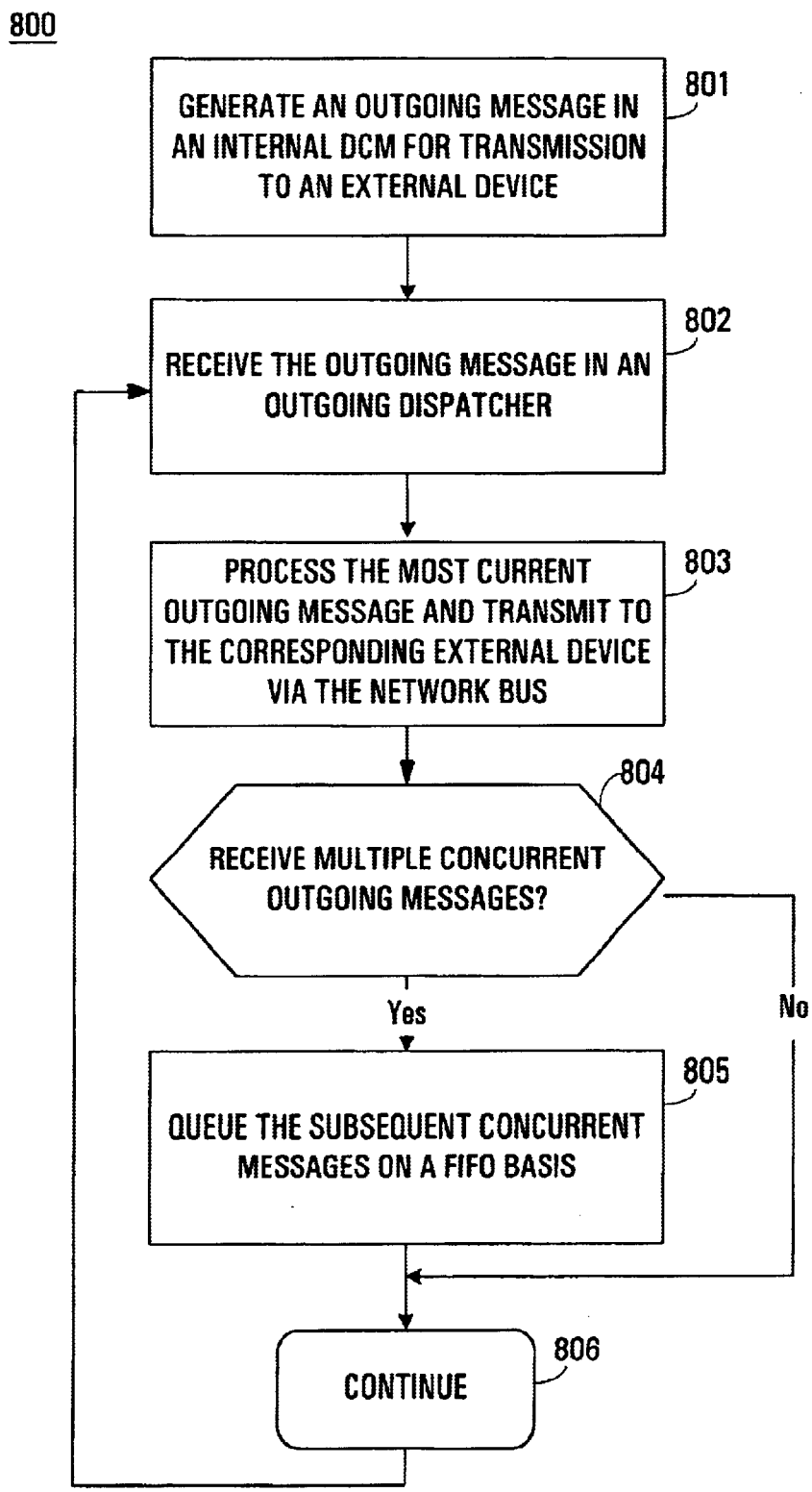
FIG. 8A shows a flow chart of the steps of an outgoing dispatching process in accordance with one embodiment of the present invention.
Figure 8B:
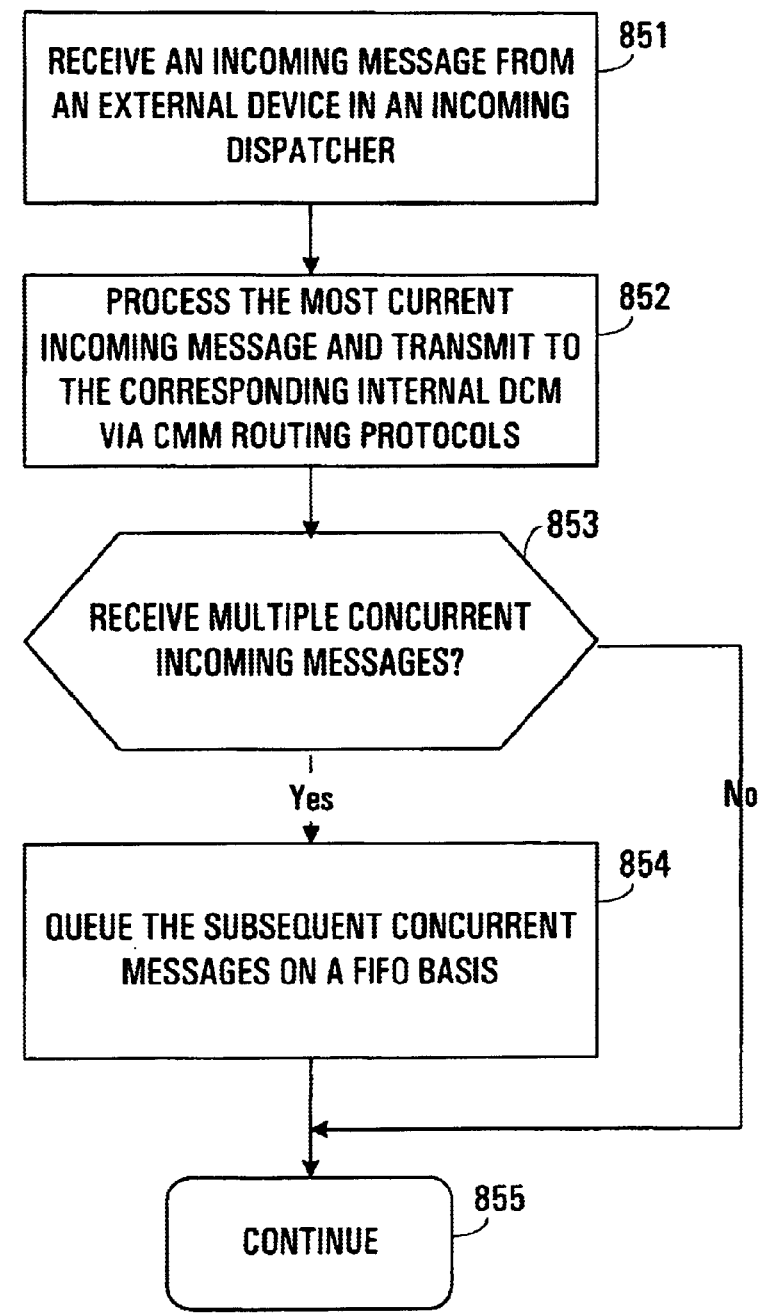
FIG. 8B shows a flow chart of the steps of an incoming dispatching process in accordance with one embodiment of the present invention.

With reference now to FIG. 8A, a flow chart of a process 800 in accordance with one embodiment of the present invention is shown. Process 800, steps 801–806, depicts the steps involved in an outgoing dispatching process for sending messages from the internal DCMs (e.g., DCMs 607–609) to other external devices coupled to the network. While process 800 shows the steps of the outgoing dispatching process, Process 850 of FIG. 8B shows the steps of an incoming dispatching process. Together, process 800 and process 850 comprise a dual dispatching process in accordance with one embodiment of the present invention.

Process 800 begins in step 801, where an outgoing message is generated in an internal DCM (e.g., one of DCMs 607–609) hosted on the FAV node (e.g., set-top box 301). As described above, the internal message, for example a request for information from a externally coupled VCR device (e.g., VCR unit 22 of FIG. 1A), is generated by the DCM and coupled to the CMM hosted on the FAV node. In step 802, the outgoing message is received by an outgoing dispatcher within the CMM. In step 803, the outgoing message is processed by the outgoing dispatcher and transmitted to the corresponding external device via the network bus (e.g., IEEE 1394 bus). In step 804, if subsequent outgoing messages are concurrently received or if a subsequent message is received prior to the completion of processing of the current message, process 800 proceeds to step 805, where the subsequent message is queued within an internal queue (e.g., queue 710 shown in FIG. 7). Then, as shown by step 806, the outgoing message dispatching process continues, as process 800 proceeds back to step 802 to receive and process subsequent messages.

Referring still to FIG. 8A, in step 804, if multiple concurrent messages are not received, process 800 proceeds to step 806 without having to queue any messages for later processing. As shown in steps 801–806, outgoing messages are continually processed and dispatched as they are received from the internal DCMs. Concurrent dispatches do not invoke re-entrant code or spawn new threads. The concurrent outgoing messages are queued and processed by the outgoing dispatcher on a FIFO basis.

Referring now to FIG. 8B, a flow chart of steps 851–855 of process 850 are shown. As described above, process 850 depicts the steps involved in an incoming dispatching process, for dispatching messages received from external devices to the appropriate internal DCM.

Process 850 begins in step 851, where an incoming message is received from an external device (e.g., VCR unit 22 of FIG. 1A) in an incoming dispatcher (e.g., dispatcher 702 of FIG. 7). As described above, the incoming message is received via the network bus, in this implementation, an IEEE 1394 bus. In step 852, the incoming message is processed in the incoming dispatcher to determine the corresponding destination DCM (e.g., one of DCMs 607–609) within the FAV node (e.g., FAV node 301). Once the corresponding DCM is determined, the message is routed to the corresponding DCM in accordance with the internal routing protocols of the CMM (e.g., CMM 612 of FIG. 6). In step 853, if multiple concurrent messages are received or if a subsequent message is received prior to the completion of processing of the current message, process 850 proceeds to step 854, where the concurrent message or messages are stored within a queue (e.g., queue 711 of FIG. 7) on a FIFO basis.

Referring still to FIG. 8B, in step 853, if multiple concurrent messages are not received, process 850 proceeds to step 855 without having to queue any messages for later processing. As shown in steps 851–855, incoming messages are continually processed and dispatched as they are received from the external devices. As described above, concurrent dispatches of incoming messages do not invoke re-entrant code or spawn new threads. The concurrent incoming messages are queued and processed by the incoming dispatcher on a FIFO basis.

Thus, the present invention provides a standardized architecture for ensuring reliable, conflict free, message passing between the various components of the home audio/video network. The present invention eliminates the possibility of resource conflicts within their internal massaging subsystems which may lead to an inability of the various devices coupled to the network to communicate, thereby avoiding conflicts that can cause a break down of the message passing system which forms the basis for the communication between the various software and hardware components within a home audio/video network. In one embodiment, the present invention provides an IEEE 1394 based system that ensures the seamless transmission and reception of data messages between the various software/hardware components within the home audio/video network, especially in those cases where the various software components may be distributed among different hardware platforms (e.g., devices) coupled to the home audio/video network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the Claims appended hereto and their equivalents.

What is claimed is:

1. A system comprising:
   a controller associated with a home audio video device coupled to a network;
   a first dispatcher; and
   a second dispatcher;
   wherein the first dispatcher receives an incoming message from the device and dispatches the incoming message to the controller;
   wherein the second dispatcher receives an outgoing message from the controller and dispatches the outgoing message to the device;
   wherein the first dispatcher and the second dispatcher operate independently; and
   wherein the first dispatcher and the second dispatchers function without reentrant code.

2. The system of claim 1 further comprising;
   a second controller associated with a second home audio video device coupled to the network;
   wherein the first dispatcher receives a second incoming message from the second device and dispatches the second incoming message to the second controller; and
   wherein the second dispatcher receives a second outgoing message from the second controller and dispatches the outgoing message to the second device.

3. The system of claim 1 wherein the first dispatcher comprises a first software-based message handling unit, and wherein the second dispatcher comprises a second software-based message handling unit.

4. The system of claim 1, wherein the first dispatcher and the second dispatcher are configured to support single threaded processing.

5. The system of claim 1, wherein the controller and the first dispatcher and the second dispatcher function in a set-top box.

6. The system of claim 1, wherein the network is compliant with an IEEE 1394 standard.

7. The system of claim 1, wherein the controller and the first dispatcher and the second dispatcher function within a node compliant with a HAVi standard.

8. A system for receiving and routing messages to and from a network of audio video devices, wherein one device includes a processor coupled to a memory having stored therein software code, which when executed by the processor, cause the device to perform a method comprising:
   receiving an incoming message from a network bus;
   dispatching the incoming message to a software controller using the first message handling unit;
   receiving an outgoing message; and
   dispatching the outgoing message using the second message handling unit such that the first message handling unit and the second message handling unit function independently free of re-entrant software code.

9. The system of claim 8, wherein the first message handling unit is an incoming dispatcher configured to support single threaded processing and the second message handling unit is an outgoing dispatcher configured to support single threaded processing.

10. The system of claim 8 further comprising:
    storing overlapping outgoing messages on a first in first out basis using the second message handling unit such that the overlapping outgoing messages are processed dispatched serially; and
    storing overlapping incoming messages on a first in first out basis using the first message handling unit such that the overlapping incoming messages are processed and dispatched serially.

11. The system of claim 8, wherein the device is a set-top box, the set-top box communicating with the network devices via the first message handling unit and the second message handling unit.

12. The system of claim 8, wherein the set-top box is configured to function as a full audio video node in a HAVi compliant network.

13. The system of claim 8, wherein the network bus is an IEEE 1394 bus.

14. A method of routing a received message to a software controller for a home audio video network of connected network devices, the method comprising:
    receiving an incoming message from a network bus by using an intelligent device coupled to said network bus, wherein said intelligent device comprises a memory having stored therein a plurality of software controllers for communicating with a plurality of network devices;
    examining the incoming message in a first message handling unit to determine a corresponding one of the plurality of software controllers within the intelligent device;
    dispatching the incoming message to the corresponding one software controller using the first message handling unit;
    receiving an outgoing message from one of the plurality of software controllers in a second message handling unit;
    examining the outgoing message to determine a corresponding one of the plurality of network devices; and
    dispatching the outgoing message to the corresponding one network device via the network bus using the second message handling unit such that the first message handling unit and the second message handling unit function independently and support dispatching without using re-entrant software code.

15. The method of claim 14, wherein the first message handling unit is an incoming dispatcher configured to support single threaded processing and the second message handling unit is an outgoing dispatcher configured to support single threaded processing.

16. The method of claim 15, further comprising:
    storing concurrent outgoing messages on a first in first out basis using the outgoing dispatcher such that the concurrent outgoing messages are processed dispatched serially; and
    storing concurrent incoming messages on a first in first out basis using the incoming dispatcher such that the concurrent incoming messages are processed and dispatched serially.

17. The method of claim 16, wherein the intelligent device is a set-top box coupled to control the plurality of network devices via the network bus, the set-top box communicating with the plurality of network devices via the incoming dispatcher and the outgoing dispatcher.

18. The method of claim 17, wherein the set-top box is configured to function as a full audio video node in a HAVi compliant network, and wherein each the plurality of software controllers are HAVi compliant device control modules.

19. The method of claim 18, wherein the network bus is an IEEE 1394 bus.

20. In a home audio video network of connected network devices, a method of routing a received message to a proper software controller, the method comprising: receiving an incoming message via a bus, performed by a controller device including an embedded computer system coupled to said bus, wherein said embedded computer system includes a processor coupled to a memory having stored therein a plurality of software controllers for communicating with a plurality of network devices; examining the incoming message using a incoming dispatcher to determine a associated on of the plurality of software controllers within the controller device; dispatching the incoming message to the associated on software controller using the incoming dispatcher; receiving an outgoing message from one of the plurality of software controllers in a outgoing dispatcher; examining the outgoing message to determine a associated one of the plurality of network devices; and dispatching the outgoing message to the associated one network device via the bus using the outgoing dispatcher such that the incoming dispatcher and the outgoing dispatcher function independently, and wherein the incoming dispatcher and the outgoing dispatcher are configured to support single threaded processing and to support dispatching free of re-entrant software code.

21. The method of claim 20, wherein:
the outgoing dispatcher includes an outgoing queue for storing overlapping outgoing messages on a first in first out basis such that the overlapping outgoing messages are processed dispatched serially; and
the incoming dispatcher includes an incoming queue for storing overlapping incoming messages on a first in first out basis such that the overlapping incoming messages are processed and dispatched serially.

22. The method of claim 20, wherein the controller device is a set-top box coupled to control the plurality of network devices via the bus, the set-top box communicating with the plurality,of network devices via the incoming dispatcher and the outgoing dispatcher.

23. The method of claim 20, wherein each the plurality of software controllers are HAVi compliant device control modules.

24. A system for receiving and routing messages to and from a HAVi network of coupled HAVi network devices via a bus, the HAVi network including a full AV node coupled to said bus, wherein said full AV node includes a processor coupled to a memory having stored therein software code, which when executed by the processor, cause the full AV node to perform a method comprising
receiving an incoming message via the bus,
examining the incoming message using a incoming dispatcher to determine a associated one of the plurality of device control modules within the full AV node;
dispatching the incoming message to the associated one device control module using the incoming dispatcher;
receiving an outgoing message from one of the plurality of device control modules in a outgoing dispatcher;
examining the outgoing message to determine a associated one of the plurality of network devices; and
dispatching the outgoing message to the associated one network device via the bus using the outgoing dispatcher such that the incoming dispatcher and the outgoing dispatcher function independently, and wherein the incoming dispatcher and the outgoing dispatcher are both configured to support single threaded processing and to support dispatching without using re-entrant software code.

25. The system of claim 24, wherein:
the outgoing dispatcher includes an outgoing queue for storing overlapping outgoing messages on a first in first out basis such that the overlapping outgoing messages are processed dispatched serially; and
the incoming dispatcher includes an incoming queue for storing overlapping incoming messages on a first in first out basis such that the overlapping incoming messages are processed and dispatched serially.

26. The system of claim 24, wherein the full AV node is a set-top box coupled to control the plurality of network devices via an IEEE 1394 bus, the set-top box communicating with the plurality of network devices via the incoming dispatcher and the outgoing dispatcher.

27. The system of claim 24, wherein the first dispatcher and the second dispatcher are implemented within a communications media manager instantiated within the full AV node, the communications media manager configured to provide an architecture for routing the incoming message and the outgoing message to and from the plurality of device control modules.

* * * * *